United States Patent
Park

(10) Patent No.: US 7,351,366 B2
(45) Date of Patent: Apr. 1, 2008

(54) METHOD OF MANUFACTURING LOW PRESSURE INJECTION TYPE RIM MOLD, AND PRODUCT FORMED USING THE MOLD

(75) Inventor: Su Yong Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 435 days.

(21) Appl. No.: 10/760,399

(22) Filed: Jan. 21, 2004

(65) Prior Publication Data

US 2005/0098919 A1     May 12, 2005

(30) Foreign Application Priority Data

Nov. 12, 2003    (KR) .................. 10-2003-0079672

(51) Int. Cl.
   *B29C 33/40* (2006.01)
(52) U.S. Cl. ............... 264/219; 264/138; 264/225; 264/271.1
(58) Field of Classification Search ............... 264/219, 264/220, 225, 138, 271.1
   See application file for complete search history.

(56) References Cited

U.S. PATENT DOCUMENTS

| | | | | |
|---|---|---|---|---|
| 4,474,722 A | * | 10/1984 | Martin | 264/219 |
| 5,124,105 A | * | 6/1992 | Broughton et al. | 264/219 |
| 5,863,365 A | * | 1/1999 | Bird | 156/87 |
| 6,796,016 B2 | * | 9/2004 | Persson | 29/558 |

FOREIGN PATENT DOCUMENTS

| | | |
|---|---|---|
| JP | 2002-264140 | 9/2002 |
| KR | 10-0311163 | 10/2001 |
| KR | 2003-0030106 | 4/2003 |
| KR | 10-0391463 | 7/2003 |

OTHER PUBLICATIONS

English Language Abstract of JP 2002-264140.
English Language Abstract of KR 01 0017003.
English Language Abstract of KR 10 2002 0082710.
English Language Abstract of KR 2003-0030106.

* cited by examiner

*Primary Examiner*—Allan R. Kuhns
(74) *Attorney, Agent, or Firm*—Greenblum & Bernstein, P.L.C.

(57) ABSTRACT

The present invention relates to a method of manufacturing a low pressure injection type RIM mold and a product molded using the mold, wherein manufacturing time is reduced by simplifying manufacturing processes and the precision of a product is prevented from being lowered. The method of manufacturing the low pressure injection type RIM mold comprises a first step of machining Styrofoam material to prepare a skin material with a base; a second step of preparing an outer frame around the machined skin material and pouring epoxy onto the machined skin material to prepare a lower mold; a third step of releasing and inverting the lower mold after the epoxy has been completely cured, and performing NC machining on the released portion of the lower mold; a forth step of preparing a thickness-defining portion on the inverted lower mold using wax or resin by means of machining for the thickness of the product, bosses and a rim; a fifth step of preparing an upper mold by pouring epoxy onto the machined surface; and a sixth step of removing the thickness-forming portion.

3 Claims, 5 Drawing Sheets

METHOD OF MANUFACTURING LOW PRESSURE INJECTION TYPE RIM MOLD, AND PRODUCT FORMED USING THE MOLD

RELATED APPLICATIONS

The present disclosure relates to subject matter contained in Korean Application No. 10-2003-0079672, filed on Nov. 12, 2003, which is herein expressly incorporated by reference its entirely.

BACKGROUND OF THE INVENTION

1. Field of the Invention

The present invention relates to a method of manufacturing a low pressure injection type RIM mold and a product molded using the mold. More particularly, the present invention relates to a method of manufacturing a low pressure injection type RIM mold and a product molded using the mold, wherein manufacturing time is reduced by simplifying manufacturing processes and the precision of a product is prevented from being lowered, that is, a more precise product can be manufactured by reducing manufacturing time to prevent the deformation of the product due to shrinkage and costs can be reduced by eliminating needs for sheet materials and manufacture of a mock-up.

2. Description of the Prior Art

Generally, as for product molding methods, there are extrusion molding, injection molding and the like. In such molding methods, a mold for producing a desired product is first manufactured and a material is injected into the mold to produce the product.

In case of the injection molding, many apparatuses are required since products are produced by injecting a material into a mold under high pressure. On the contrary, in case of producing products in small quantities, the products are generally produced by manufacturing a simple mold called "RIM mold" and injecting a material into the mold under low pressure.

FIGS. 1 to 5 are schematic views illustrating respective steps of a conventional method of manufacturing a RIM mold. The conventional method of manufacturing the RIM mold comprises the following steps.

First, the step illustrated in FIG. 1 is the step of forming a "skin" material based on skin data on a product. In this step, a base 1 made of plywood is prepared and a mock-up 2 is then prepared on the base 1 by performing pre-forming operations using wood or resin and NC machining.

As shown in FIG. 2, an outer frame 3 is prepared around the mock-up 2 after the mock-up 2 has been prepared as described above. Then, a gel coat 4 is stacked on the mock-up 2 and reinforcing epoxy 5 is stacked on the gel coat 4, thereby preparing a lower mold 6.

Thereafter, as shown in FIG. 3, the lower mold 6 is released and inverted after the epoxy resin of the lower mold has been completely cured. Then, wax or resin 7 is stacked on the inverted lower mold 6 and then subjected to machining for the thickness of a product, bosses and a rim.

Then, an upper mold 8 is prepared by stacking a gel coat 4 on the machined surface and stacking reinforcing epoxy 5 on the gel coat (FIG. 4). As shown in FIG. 5, the upper mold 8 is released and the thickness-defining portion is then removed.

Subsequently, a material is injected into a gate of the mold with low pressure (atmospheric pressure) to produce a product.

However, such a conventional method of manufacturing the mold described above has a problem in that a great deal of manufacturing time is required due to the complicated processes. Further, it has a problem in that since the gel coat, the reinforcing epoxy and the like are stacked on the prepared skin material and the upper mold is then prepared thereon as described above, it is not possible to accurately reproduce the shape of products, resulting in deterioration of the precision of the products.

SUMMARY OF THE INVENTION

The present invention is conceived to solve the aforementioned problems. An object of the present invention is to provide a method of manufacturing a low pressure injection type RIM mold and a product molded using the mold, wherein a more precise product can be manufactured by reducing manufacturing time to prevent the deformation of the product due to shrinkage and costs can be reduced by eliminating needs for sheet materials and manufacture of a mock-up.

According to the present invention, there is provided a method of manufacturing a low pressure injection type RIM mold, comprising a first step of machining STYROFOAM® (a polystyrene foam sold by Dow Chemical Co.) material so that a skin material with a base for a product can be prepared using skin data on the product; a second step of preparing an outer frame around the machined skin material and pouring epoxy onto the machined skin material to prepare a lower mold; a third step of releasing and inverting the lower mold after the epoxy has been completely cured, and performing NC machining on the released portion of the lower mold; a fourth step of preparing a thickness-defining portion on the inverted lower mold using wax or resin by means of machining for the thickness of the product, bosses and a rim; a fifth step of preparing an upper mold by pouring epoxy onto the machined surface; and a sixth step of removing the thickness-forming portion.

BRIEF DESCRIPTION OF THE DRAWINGS

The above and other objects and features of the present invention will become apparent from the following description of a preferred embodiment given in conjunction with the accompanying drawings, in which.

DESCRIPTION OF THE PREFERRED EMBODIMENTS

Hereinafter, an embodiment of the present invention will be described in detail with reference to the accompanying drawings.

FIGS. 6 to 11 are schematic views illustrating steps of a method of manufacturing a low pressure injection type RIM mold according to the present invention. The method of the present invention comprises the following steps.

Figure 1:
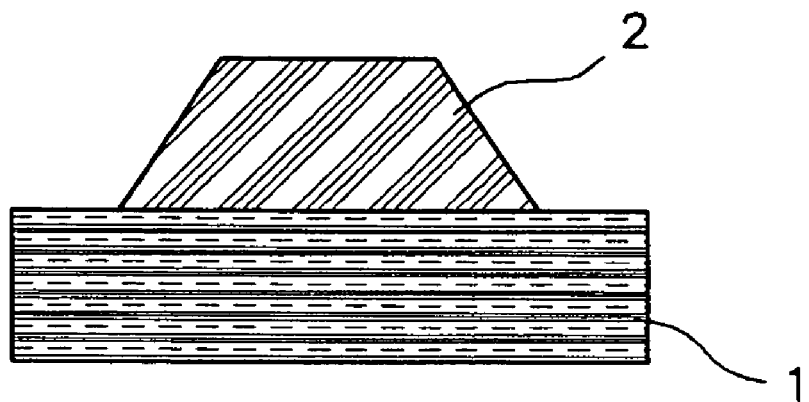
FIGS. 1 to 5 are schematic views illustrating respective steps of a conventional method of manufacturing a RIM mold.
Figure 2:
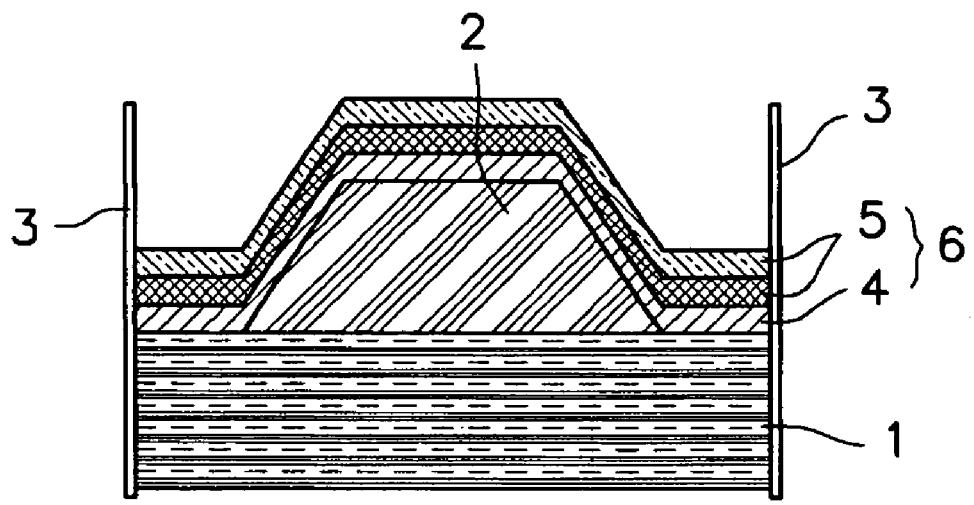
Figure 3:
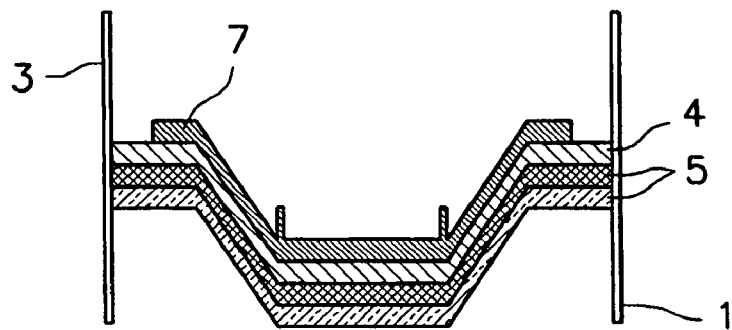
Figure 4:
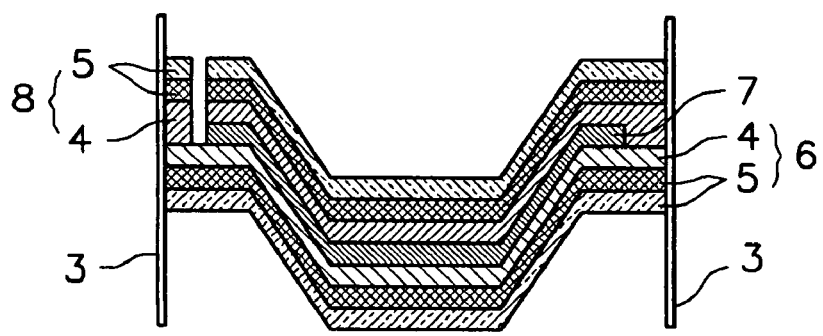
Figure 5:
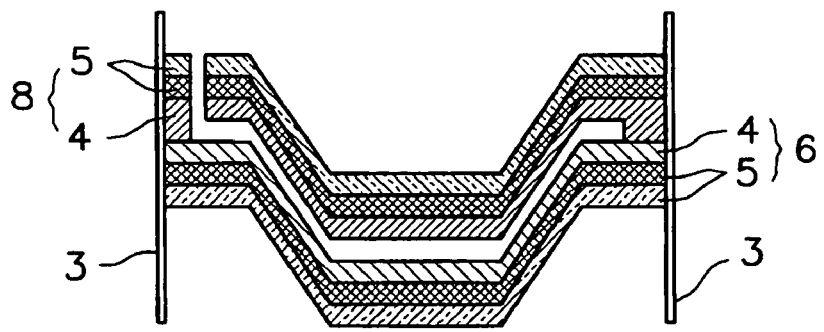
Figure 6:
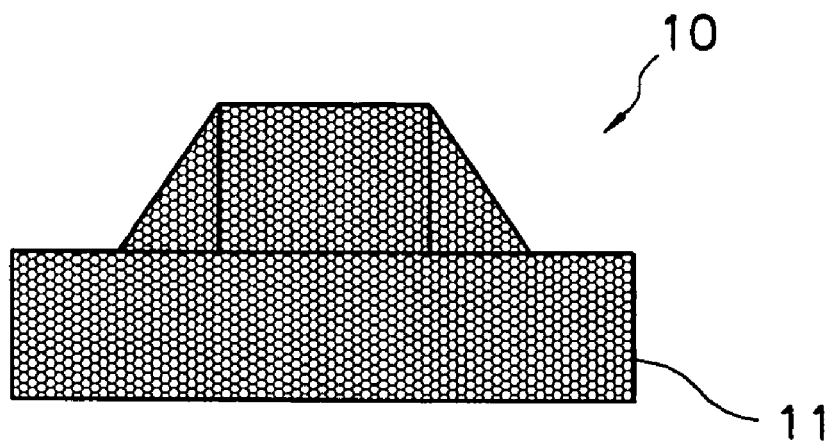
FIG. 6 is a schematic view showing a first step of a method of manufacturing a low pressure injection type RIM mold according to the present invention.

A first step of the method shown in FIG. 6 is the step of forming a skin material based on skin data on a product. In this step, the skin material 10, including a base 11, for the product is formed using a STYROFOAM® (a polystyrene foam sold by Dow Chemical Co.) material. Thereafter, as shown in FIG. 7, a second step of the method is performed in such a manner that an outer frame 20 is prepared around the skin material and epoxy is poured onto the skin material to prepare a lower mold 30.

Figure 8:
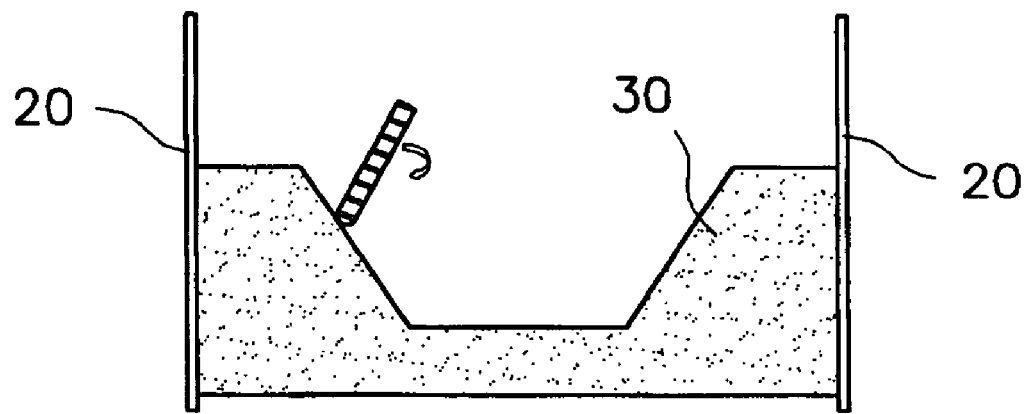
FIG. 8 is a schematic view showing a third step of the method of manufacturing the low pressure injection type RIM mold according to the present invention.
Figure 9:
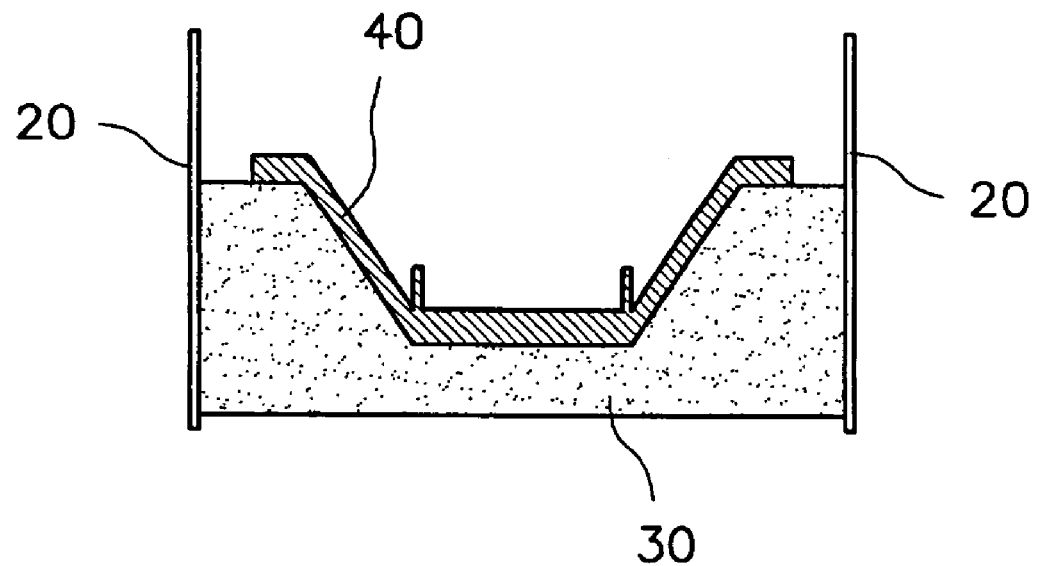
FIG. 9 is a schematic view showing a fourth step of the method of manufacturing the low pressure injection type RIM mold according to the present invention.

Thereafter, as shown in FIG. 8, a third step is performed in such a manner that the lower mold 30 is released and inverted after the epoxy resin of the lower mold has been completely cured, and the released surface of the lower mold 30 is subjected to NC machining. Then, a fourth step is performed in such a manner that wax or resin is stacked on the inverted lower mold 30 and then subjected to machining for the thickness of a product, bosses and a rim to form a thickness-defining portion 40 (FIG. 9).

Figure 10:
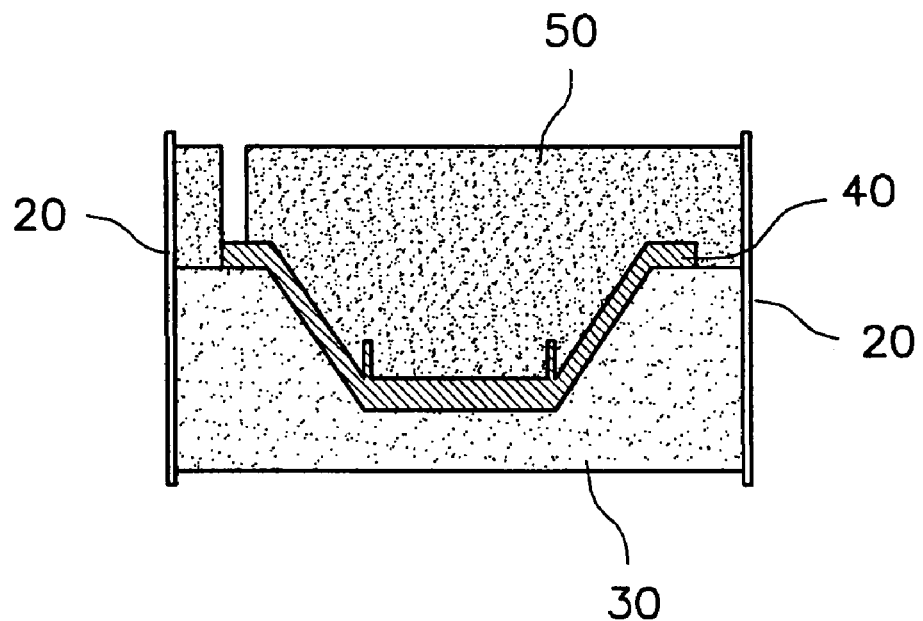
FIG. 10 is a schematic view showing a fifth step of the method of manufacturing the low pressure injection type RIM mold according to the present invention.
Figure 11:
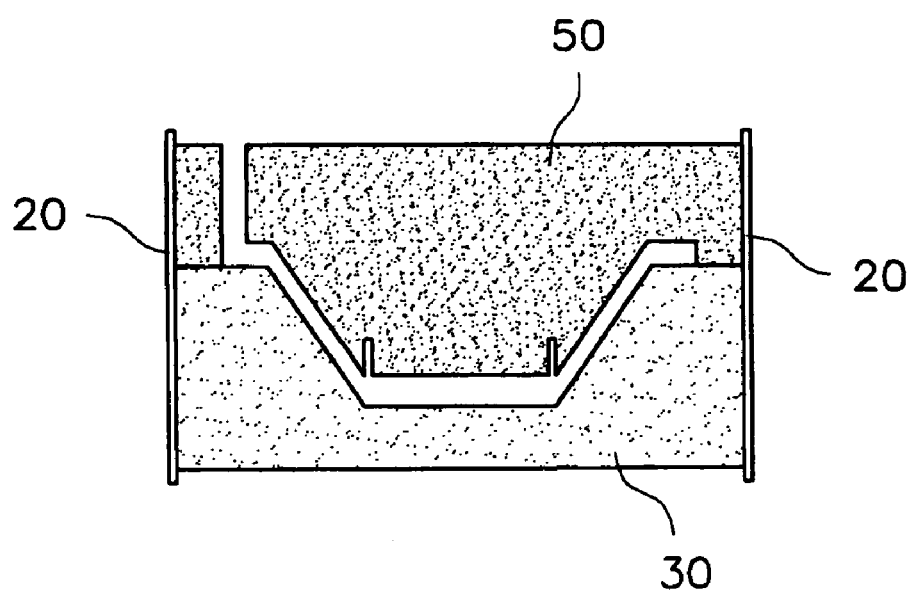
FIG. 11 is a schematic view showing a sixth step of the method of manufacturing the low pressure injection type RIM mold according to the present invention.

Subsequently, as shown in FIG. 10, a fifth step is performed in such a manner that epoxy is poured onto the machined surface to prepare an upper mold 50. Thereafter, as shown in FIG. 11, a sixth step of removing the thickness-defining portion 40 formed through the machining for the thickness, bosses and rim is performed to manufacture the mold of the present invention.

Figure 7:
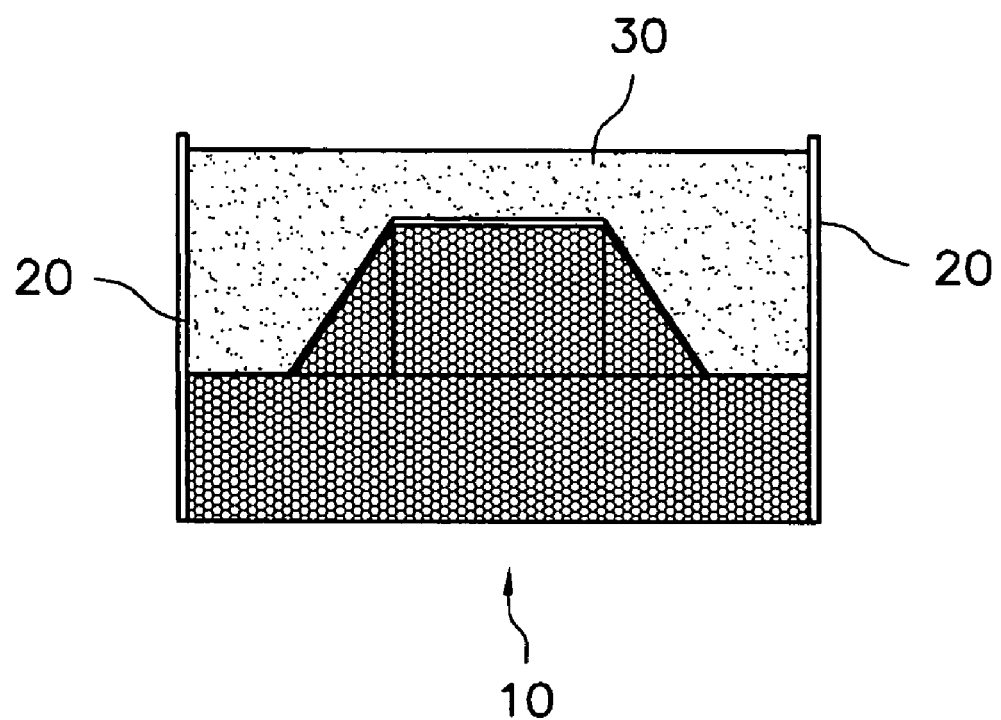
FIG. 7 is a schematic view showing a second step of the method of manufacturing the low pressure injection type RIM mold according to the present invention.

In the second step, it is preferred that the lower mold 30 be prepared by pouring the epoxy such that the skin material is immersed in the epoxy and the surface of the epoxy is in a horizontal state, as shown in FIG. 7.

Further, even in the fifth step of preparing the upper mold 50, the upper mold 50 is prepared by pouring the epoxy such that the thickness-defining portion 40 is immersed in the epoxy and the surface of the epoxy is in a horizontal state, as shown in FIG. 10.

The operation and effects of the present invention will be described with reference to FIGS. 6 to 11 as follows.

In the method of manufacturing the RIM mold according to the present invention, the skin material 10 is prepared using the STYROFOAM® (a polystyrene foam sold by Dow Chemical Co.) material, which are easy to be subjected to NC machining, instead of wood or resin (first step), and the RIM mold is then manufactured using the skin material 10 without repeatedly pouring gel-coat or epoxy. The subsequent steps of the method will be described in greater detail as follows.

When the skin material 10 is prepared as described above, the outer frame 20 is prepared around the skin material and the epoxy is poured onto the surfaces defined by the skin material 10 and the outer frame 20, thereby preparing the lower mold 30 (the second step).

At this time, the lower mold 30 can be prepared more simply since it is prepared by filling a space defined by the outer frame 20 and the skin material 10 with the epoxy such that the skin material 10 is immersed in the epoxy as shown in FIG. 7.

Then, as described above, the lower mold 30 is released and inverted. The surface of the released and inverted lower mold is subjected to NC machining for finishing and subsequent rest material re-machining (the third step).

As described above, the contour for molding is obtained in a simpler manner. At this time, the shape of the surface subjected to the NC machining is closer to the original shape as compared with a conventional mold.

Thereafter, the thickness-defining portion 40 is formed on the NC machined surface by means of the machining for the thickness, bosses and rim (the forth step). Then, the upper mold 50 is prepared by pouring the epoxy again (the fifth step).

Finally, the mold of the present invention is manufactured by removing the thickness-defining portion 40 (the sixth step).

Therefore, the present invention has advantages in that a more precise product can be manufactured by reducing manufacturing time to prevent the deformation of the product due to shrinkage and costs can be reduced by eliminating needs for sheet materials and manufacture of a mock-up.

Although the present invention has been described by way of example in connection with the preferred embodiment in order to specifically describe the technical spirit of the present invention, the scope of the present invention is not limited to the accompanying drawings and the embodiment.

What is claimed is:

1. A method of manufacturing a low pressure injection type RIM mold, comprising:

machining a material that is suitable for NC machining, so that a skin material with a base for a product can be prepared using skin data on the product;

preparing an outer frame around the machined skin material and pouring epoxy directly onto the machined skin material to prepare a lower mold;

releasing and inverting the lower mold after the epoxy has been completely cured, and performing NC machining on the released portion of the lower mold;

preparing a thickness-defining portion on the inverted lower mold using one of wax and resin by machining for the thickness of the product, bosses and a rim;

preparing an upper mold by pouring epoxy onto the machined surface wherein a thickness-forming portion is formed; and removing the thickness-forming portion to thereby form a RIM mold, wherein the skin material prepared in the machining is made of polystyrene.

2. The method as claimed in claim 1, wherein in the preparing an outer frame, the lower mold is prepared by pouring the epoxy such that the skin material is immersed in the epoxy and the surface of the epoxy is in a horizontal state.

3. The method as claimed in claim 1, wherein in the preparing an upper mold, the upper mold is prepared by pouring the epoxy such that the thickness-forming portion is immersed in the epoxy and the surface of the epoxy is in a horizontal state.

* * * * *